US009374798B2

(12) United States Patent
Edge

(10) Patent No.: US 9,374,798 B2
(45) Date of Patent: Jun. 21, 2016

(54) SUPPORT OF MULTIPLE POSITIONING PROTOCOLS

(75) Inventor: Stephen W. Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 1103 days.

(21) Appl. No.: 13/046,581

(22) Filed: Mar. 11, 2011

(65) Prior Publication Data

US 2012/0088518 A1  Apr. 12, 2012

Related U.S. Application Data

(60) Provisional application No. 61/348,606, filed on May 26, 2010.

(51) Int. Cl.
*H04W 24/00* (2009.01)
*H04W 64/00* (2009.01)
*H04W 88/06* (2009.01)

(52) U.S. Cl.
CPC .............. *H04W 64/00* (2013.01); *H04W 88/06* (2013.01)

(58) Field of Classification Search
CPC ... H04W 64/00; H04W 4/02; H04L 29/08657
USPC .......................... 455/456.1, 404.2, 422.1, 423
See application file for complete search history.

(56) References Cited

U.S. PATENT DOCUMENTS

| 2002/0132626 | A1 | 9/2002 | Tsunehara et al. | |
| 2003/0008622 | A1* | 1/2003 | Fernandez-Corbaton | G01S 5/0215 455/68 |
| 2006/0276167 | A1* | 12/2006 | Burroughs | G01S 5/0027 455/404.2 |
| 2007/0182547 | A1 | 8/2007 | Wachter et al. | |
| 2007/0237094 | A1 | 10/2007 | Bi et al. | |
| 2009/0189810 | A1* | 7/2009 | Murray | 342/357.14 |
| 2009/0233620 | A1* | 9/2009 | Fischer et al. | 455/456.1 |
| 2009/0286552 | A1 | 11/2009 | Wu | |
| 2009/0311987 | A1 | 12/2009 | Edge et al. | |
| 2010/0013701 | A1 | 1/2010 | Fischer et al. | |
| 2010/0013702 | A1 | 1/2010 | Lin et al. | |
| 2010/0137003 | A1* | 6/2010 | Goldfarb | 455/456.1 |
| 2010/0323717 | A1* | 12/2010 | Agashe | G01S 1/68 455/456.1 |
| 2011/0009132 | A1* | 1/2011 | Skarby et al. | 455/456.5 |

FOREIGN PATENT DOCUMENTS

| CN | 1375999 A | 10/2002 |
| EP | 1773076 A1 | 4/2007 |
| JP | 2007139515 A | 6/2007 |
| JP | 2013520072 A | 5/2013 |
| KR | 1020080102279 | 11/2008 |
| WO | 2005004528 | 1/2005 |
| WO | WO-2009124206 A2 | 10/2009 |
| WO | WO-2011099909 A1 | 8/2011 |

OTHER PUBLICATIONS

International Search Report and Written Opinion—PCT/US2011/038211—ISA/EPO—Jul. 26, 2011.
Taiwan Search Report—TW100118491—TIPO—Sep. 18, 2014.

* cited by examiner

*Primary Examiner* — Nghi H Ly
(74) *Attorney, Agent, or Firm* — Arnold J. Gum

(57) ABSTRACT

A mobile terminal and network location server support multiple positioning protocols so that a first position measurement of the mobile terminal may be obtained using a positioning protocol defined for a first wireless network and a second position measurement of the mobile terminal may be obtained using a different positioning protocol defined for a different wireless network during the same location session. The first position measurement and the second position measurement can then be used together to determine a position of the mobile terminal.

33 Claims, 4 Drawing Sheets

SUPPORT OF MULTIPLE POSITIONING PROTOCOLS

CROSS-REFERENCE TO PENDING PROVISIONAL APPLICATION

This application claims priority under 35 USC 119 to U.S. Provisional Application No. 61/348,606, filed May 26, 2010 and entitled "Support of Multiple Positioning Protocols " which is assigned to the assignee hereof and which is incorporated herein by reference.

BACKGROUND

It is often desirable, and sometimes necessary, to know the location or position of a wireless device in a network. The terms "location" and "position" are synonymous and are used interchangeably herein. For example, a wireless device may place an emergency call in response to an emergency event. It may be desirable to provide the emergency center with an accurate location of the mobile station. In another example, a user may utilize a wireless device to browse through a website and may click on location sensitive content. A web server may then query the network for the position of the wireless device. The network may initiate position processing with the wireless device in order to ascertain the position of the wireless device. The network may then return a position estimate for the wireless device to the web server, which may use this position estimate to provide appropriate content to the user. Position determination processes may be used to estimate or otherwise determine a location of a device associated with a wireless communication network. In a particular example, a position determination process may be implemented to estimate location coordinates for a mobile device such as a cellular telephone or other like mobile terminals. There are a variety of techniques available to support position determination processes. For example, a Satellite Positioning System (SPS) such as the Global Positioning System (GPS) and/or other like systems may be used to estimate the location of a mobile terminal. There are many other scenarios in which knowledge of the position of the wireless device is useful or necessary.

There is therefore a need in the art for techniques to efficiently provide location services.

SUMMARY

A mobile terminal and network location server support multiple positioning protocols during the same location session. Consequently, a first position measurement of the mobile terminal may be obtained using a positioning protocol defined for a first wireless network and a second position measurement of the mobile terminal may be obtained using a different positioning protocol defined for a different wireless network during the same location session. The first position measurement and the second position measurement can then be used together to determine the position of the mobile terminal.

In one embodiment, a method includes obtaining a first position measurement of a mobile terminal using a first positioning protocol defined for a first wireless network; obtaining a second position measurement of the mobile terminal using a second positioning protocol that is different than the first positioning protocol and that is defined for a second wireless network that is different than the first wireless network; and using the first position measurement and the second position measurement together to determine a position of the mobile terminal.

In a further embodiment, an apparatus includes a transceiver to communicate with a first wireless network and a second wireless network that is different than the first wireless network; a processor connected to the transceiver; memory connected to the processor; and software held in the memory and run in the processor to cause the processor to obtain a first position measurement using a first positioning protocol defined for the first wireless network and to obtain a second position measurement using a second positioning protocol that is different than the first positioning protocol and that is defined for the second wireless network that is different than the first wireless network in a same location session.

In yet another embodiment, a system for determining a position of a mobile terminal includes means for obtaining a first position measurement of the mobile terminal using a first positioning protocol defined for a first wireless network; means for obtaining a second position measurement of the mobile terminal using a second positioning protocol that is different than the first positioning protocol and that is defined for a second wireless network that is different than the first wireless network; and means for using the first position measurement and the second position measurement together to determine the position of the mobile terminal.

In yet another embodiment, a non-transitory computer-readable medium including program code stored thereon includes program code to obtain a first position measurement using a first positioning protocol defined for a first wireless network; program code to obtain a second position measurement using a second positioning protocol that is different than the first positioning protocol and that is defined for a second wireless network that is different than the first wireless network in a same location session.

DETAILED DESCRIPTION

Figure 1:
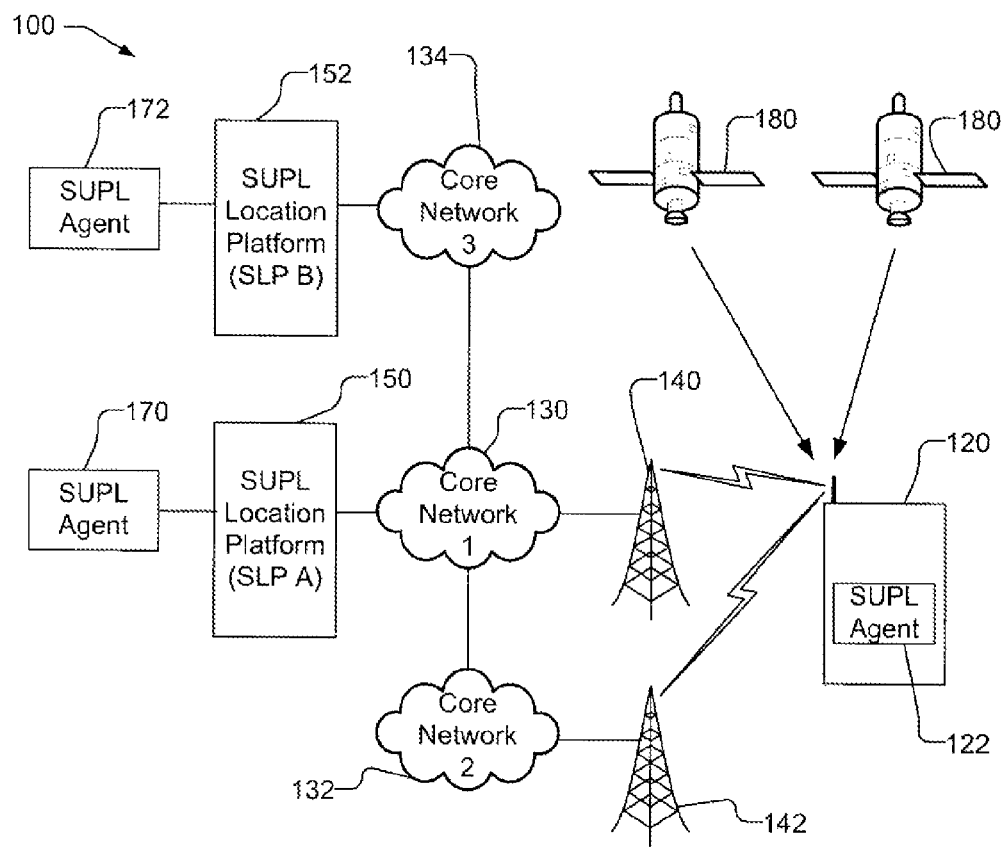
FIG. 1 shows a network architecture capable of providing location services for a mobile terminal using multiple positioning protocols during the same location session.

FIG. 1 shows a network architecture 100 capable of providing location services for Secure User Plane Location (SUPL) enabled terminals, sometimes referred to as "SET" and is referred to herein as a mobile terminal. A mobile terminal as used herein is a device capable of communicating with SUPL capable entities that support positioning and location services for mobile terminals. Mobile terminal 120 may include a SUPL agent 122 capable of accessing SUPL capable entities. The location of the mobile terminal 120 may be obtained on behalf of the SUPL agent 122 in the mobile terminal 120 or a SUPL agent 170 or 172 external to the mobile terminal 120. For simplicity, only one mobile terminal 120 is shown in FIG. 1. As used herein, a mobile terminal refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile terminal" is also intended to include devices which communicate with a personal navigation device (PND), such as by short-range wireless, infrared, wireline connection, or other connection —regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, cellular wireless network or other network, and regardless of whether satellite signal reception, assistance data reception, and/or position-related processing occurs at the device, at a server, or at another device associated with the network. Any operable combination of the above are also considered a "mobile station."

Mobile terminal 120 may communicate with first core network (Core Network 1) 130 for various services such as voice, packet data, messaging, and so on. Mobile terminal 120 may also communicate with SUPL capable entities via a Core Network 1 130. Mobile terminal 120 communicates with the Core Network 1 130 through a first Radio Access Network (RAN1) 140, which is associated with the Core Network 1 130. Mobile terminal 120 also receives and measure signals from a second Radio Access Network (RAN2) 142 that supports some radio access technology different to RAN1 140 and that is associated with a second core network (Core Network 2) 132. Core Network 1 and Core Network 2 may be the same Core Network or may be different Core Networks. In the latter case, Core Network 1 and Core Network 2 may belong to the same network operator or to different network operators. Position determination techniques described herein may be implemented in conjunction with wireless communication networks RAN1 140 and RAN2 142, which may be wireless wide area networks (WWAN), wireless local area networks (WLAN), a wireless personal area networks (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on. A CDMA network may implement one or more radio access technologies (RATS) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, RAN1 140 may be, e.g., an evolved UMTS Terrestrial Radio Access Network (E-UTRAN) (LTE) network, a W-CDMA UTRAN network, a GSM/EDGE Radio Access Network (GERAN), a 1xRTT network, an Evolution-Data Optimized (EvDO) network, a WiMax network or a WLAN, while RAN2 142 may be one of the above networks that is different than RAN1 140.

Mobile terminal 120 may also receive signals from one or more Earth orbiting satellite vehicles (SVs) 180, which are part of satellite positioning system (SPS). The SVs, for example, may be in a constellation of Global Navigation Satellite System (GNSS) such as Global Positioning System (GPS), Galileo, Glonass or Compass. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou or Compass over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Mobile terminal 120 may measure signals from SVs 180 and/or RAN1 140 associated with Core Network 1 130 and may obtain pseudo-range measurements for the satellites and network measurements from RAN1 140. The pseudo-range measurements and/or network measurements may be used to derive a position estimate for mobile terminal 120.

Location of the mobile terminal 120 may be obtained using SUPL by employing SUPL Location Platform (SLP A) 150 that is within or associated with the serving Core Network 1 130 or another SUPL Location Platform (SLP B) 152 that is within or associated with another core network (illustrated, as Core Network 3 134), which may be the home network of the mobile terminal 120. Although Core Network 3 is shown as distinct from Core Network 2 in FIG. 1, Core Network 3 and Core Network 2 may be the same Core Network. The SUPL Location Platforms (generally referred to as SLPs) are responsible for SUPL service management and position determination. SUPL service management may include managing locations of mobile terminals and storing, extracting, and modifying location information of target mobile terminals. The SLPs may include a SUPL Location Center (SLC) that performs various functions for location services, coordinates the operation of SUPL, and interacts with mobile terminals over user plane bearer. For example, the SLC may perform functions for privacy, initiation, security, roaming support, charging/billing, service management, position calculation, and so on. SLPs may also include a SUPL Positioning Center (SPC) that supports positioning for mobile terminals, is responsible for messages and procedures used for position calculation, and supports delivery of assistance data to the mobile terminals. The SPC may perform functions for security, assistance data delivery, reference retrieval, position calculation, and so on. An SPC has access to GPS receivers (a reference network, perhaps a global one) and receives signals for satellites so that it can provide assistance data. An SPC may also have access to location related information related to one or more radio access networks—for example RAN1 140 or RAN2 142 in FIG. 1. Such information may include the identities and location coordinates of the base stations in the radio access networks, the transmission timings of the base stations (e.g. whether synchronized to one another or to a GNSS system time or whether not synchronized but where the timing differences between pairs of base stations are provided), the transmission power and antenna characteristics of the base stations, etc.

Positioning protocols, sometimes referred to simply as protocols, are employed between the mobile terminal 120 and either SLP A 150 or SLP B 152. The positioning protocol defines the signaling and procedures to be used by the mobile terminal 120 and the SLP for positioning of the mobile terminal 120 including the positioning methods, the measurements made by the mobile terminal 120 and any assistance data provided by the SLP to the mobile terminal 120 to assist in obtaining measurements and/or computing a position.

A SUPL agent (e.g., SUPL agent 122, 170 or 172) is a function or an entity that obtains location information for a target mobile terminal. The location information may be needed and used by the SUPL Agent (e.g. to provide some location related service such as direction finding or navigation to the user of mobile terminal 120 or to some other user) or may be provided by the SUPL Agent to some other client for a similar purpose. In general, a SUPL agent may reside in a network entity (e.g., SUPL agent 170) or a mobile terminal (e.g., SUPL agent 122) or may be external to both the network and the mobile terminal. In the case of a mobile terminal resident SUPL agent, it may or may not access network resources to obtain the location information. A network resident SUPL agent may utilize Mobile Location Services applications (MLS Apps) to access a location server, e.g., SLP A 150. An MLS application is an application that requests and consumes location information. Location information may be any information related to location and may comprise various types of position estimate (e.g., latitude and longitude coordinates, latitude and longitude with an expected error estimate, etc). MLS covers interaction between a SUPL agent and a location server, whereas SUPL covers interaction between a location server and a mobile terminal.

A number of location solutions have been defined to support positioning of wireless terminals. Some of these solutions employ a control plane method (e.g. the solution defined for "3rd Generation Partnership. Project" (3GPP) networks in 3GPP Technical Solutions (TSs) 23.271, 49.031, 25.305and 36.305) while others employ a user plane method (e.g. the SUPL 1.0 and SUPL 2.0 solutions defined by OMA). Conventionally, in all of these solutions, a single positioning protocol is used between the target terminal, e.g., mobile terminal 120, and a network location server, e.g., SLP A in FIG. 1 for the SUPL solution or a Serving Mobile Location Center (SMLC) for a 3GPP Control Plane Solution (not shown in FIG. 1), in order to obtain the location Of the target terminal whenever one or more positioning methods are employed that require location measurements from the target terminal that is being positioned. The positioning protocol that is used may depend on the type of wireless network that is serving the target terminal. For example, the positioning protocols required or allowed to be used by the SUPL location solution for different types of wireless serving network are shown in Table 1 below, where Radio Resource LCS (Location Services) Protocol (RRLP) is defined in 3GPP TS 44.031, Radio Resource Control (RRC) is defined in 3GPP TS 25.331, Long Term Evolution (LTE) Positioning Protocol (LPP) is defined in 3GPP TS 36.355, IS-801 is defined in 3GPP2 CS0022. Note that for the 3GPP Control Plane solution, only one positioning protocol is required and allowed for each type of serving wireless access network and is the first protocol listed for each 3GPP serving network in Table 1 (i.e. for LTE it is LPP and for WCDMA it is RRC).

TABLE 1

| Serving Wireless Network | Positioning Protocols required by SUPL |
|---|---|
| GSM | RRLP |
| WCDMA | RRC or RRLP |
| LTE | LPP or RRLP or IS-801 |
| 1x or EvDO | IS-801 |
| WiMax | RRLP or IS-801 |
| WLAN | RRLP or IS-801 |

The positioning protocols defined for SUPL support measurements and positioning methods applicable to the type of serving wireless network. For example, the RRLP that is defined in 3GPP TS 44.031 supports Enhanced Observed Time Difference (E-OTD) which is a positioning method that uses mobile terminal timing measurements of GSM base stations. RRLP also supports Assisted GPS (A-GPS) and Assisted Galileo and Additional Navigation Satellite Systems (A-GANSS) position methods in a manner that is optimized for a mobile terminal with a GSM serving network. RCC defined in 3GPP TS 25:331 supports Observed Time Difference of Arrival (OTDOA) position method that applies to a mobile terminal with a WCDMA serving network, as well as A-GPS and A-GANSS position methods. Similarly, LPP supports OTDOA, Enhanced Cell ID (E-CID) and Assisted Global Navigation Satellite System (A-GNSS) position methods that apply to a mobile terminal with an LTE serving network and IS-801 supports Advanced Forward. Link Trilateration (AFLT) and A-GNSS position methods that apply to a mobile terminal with a cdma2000 1xRTT or EvDO serving network. Table 2 below shows the position methods currently defined for each position protocol.

TABLE 2

| Position Protocol | Position Methods |
|---|---|
| RRLP | E-OTD, A-GPS, A-GANSS |
| RRC | OTDOA for WCDMA, A-GPS, A-GANSS |
| LPP | E-CID for LTE, OTDOA for LTE, A-GNSS |
| IS-801-B | AFLT, A-GNSS |

To improve positioning reliability and accuracy, the mobile terminal may support position methods applicable to wireless access networks that are different than the serving network and that correspond to networks in the same geographic area with base stations and access points whose signals can be received and measured by the mobile terminal. For example, mobile terminal 120 in FIG. 1 may be enabled to support position methods applicable to both RAN1 140 (the serving wireless access network), as well as RAN2 142, which is in the same geographic area as RAN1 140, if the signals from RAN2 142 can be received and measured by the mobile terminal 120. Consequently, the mobile terminal 120 may be enabled to provide additional measurements to a network location server (e.g. SLP A 150 or SLB B 152) to better support mobile terminal assisted positioning and the network location server (e.g. SLP A 150 or SLB B 152) may be enabled to provide additional assistance data to mobile terminal 120 (applicable to position methods associated with both RAN1 140 and RAN2 142) to better support mobile terminal assisted positioning or mobile terminal based positioning in which the terminal obtains its own position based on signal measurements (e.g. of or associated with RAN1 140 and RAN2 142) and the assistance data.

For example, if a mobile terminal has a Serving LTE network (such as RAN1 140 in FIG. 1) but can also receive signals from a cdma2000 1x or EvDO network (such as RAN2 142 in FIG. 1), then besides supporting A-GNSS and OTDOA positioning for LTE, a mobile terminal might also support AFLT positioning for 1x or EvDO—e.g. by providing additional AFLT measurements of 1x and/or EvDO base stations to a network location server (such as SLP 150 or SLP 152 in FIG. 1). In this case, a mobile terminal might also support A-GNSS positioning in association with a 1x or EvDO network instead of in association with the serving LTE network. These additional or alternative measurements may improve the accuracy and reliability of positioning and may be convenient to support in the mobile terminal or network—e.g. if the mobile terminal or network already implements location support for 1x or EvDO. but has not yet implemented or fully implemented location support for LTE.

In an alternative scenario, a mobile terminal accessing a 1x or EvDO network (such as RAN1 140 in FIG. 1) may also be able to receive signals from an LTE network (such as RAN2 142 in FIG. 1). In this case, besides supporting the AFLT and A-GNSS position methods for 1x or EvDO, the mobile terminal could also or instead support E-CID, OTDOA and A-GNSS for LTE.

To support position methods that apply to both the serving wireless network and at least one other wireless network, a mobile terminal could support one of the positioning protocols defined for the serving network with the positioning protocol supporting the position methods for both the serving network and the one or more other networks. Such an approach would require that the chosen positioning protocol support position methods for both the serving network type for which it was originally defined and other serving networks. This approach would increase the amount of standardization of position protocols and the amount of implementation by network location servers and terminals since each position method might have to be defined and implemented in multiple position protocols. For example, in the case of either a mobile terminal with an LTE serving network able to receive signals from a 1x or EvDO network or a mobile terminal with a 1x or EvDO serving network able to receive signals from an LTE network, the AFLT and OTDOA position methods might need to be defined and implemented in both LPP and IS-801. In general this approach could lead to every position method being defined and implemented in every positioning protocol.

Referring to Table 2, the only position method that is currently defined and implemented in more than one position protocol is A-GNSS (which is the same as A-GPS plus A-GANSS) and this is only because most of the measurements and assistance data for this method are independent of the serving wireless access type. Each of the other position methods shown in Table 2 is defined in only one positioning protocol. Defining these position methods in other position protocols would add to standardization and to implementation.

To avoid adding existing position methods to more positioning protocols, the mobile terminal and network server may support two or more position protocols simultaneously to position a mobile terminal. Supporting two or more positioning protocols simultaneously would be possible by exchanging separate messages for each position protocol and by having a mobile terminal provide its capabilities to support more than one position protocol to the network location server (and/or by having a network location server provide its capabilities to support more than one position protocol to the mobile terminal). Supporting two or more positioning protocols simultaneously would allow a mobile terminal and network server to support the positioning methods associated with all of the position protocols. For example, referring to FIG. 1, if the mobile terminal 120 and location server SLP-A 150 were to support LPP and IS-801 when mobile terminal's 120 serving network, e.g., RAN1 140, is LTE and a nearby network, e.g., RAN2 142, was 1x or EvDO is (or vice versa), it would be possible to obtain the mobile terminal 120 location using A-GNSS (with either LPP or IS-801), AFLT (with IS-801 for 1x and/or EvDO), OTDOA for LTE (with LPP) and E-CID for LTE (with LPP). Alternatively, a subset of the above positioning methods might be used—e.g. if mobile terminal 120 or location server SLP-A 150 do not support all of these position methods. A similar enlarged combination of position methods becomes available when a mobile terminal has access to other types of nearby wireless networks in addition to its serving wireless network if the mobile terminal and location server support more than one position protocol at the same time.

Figure 2:
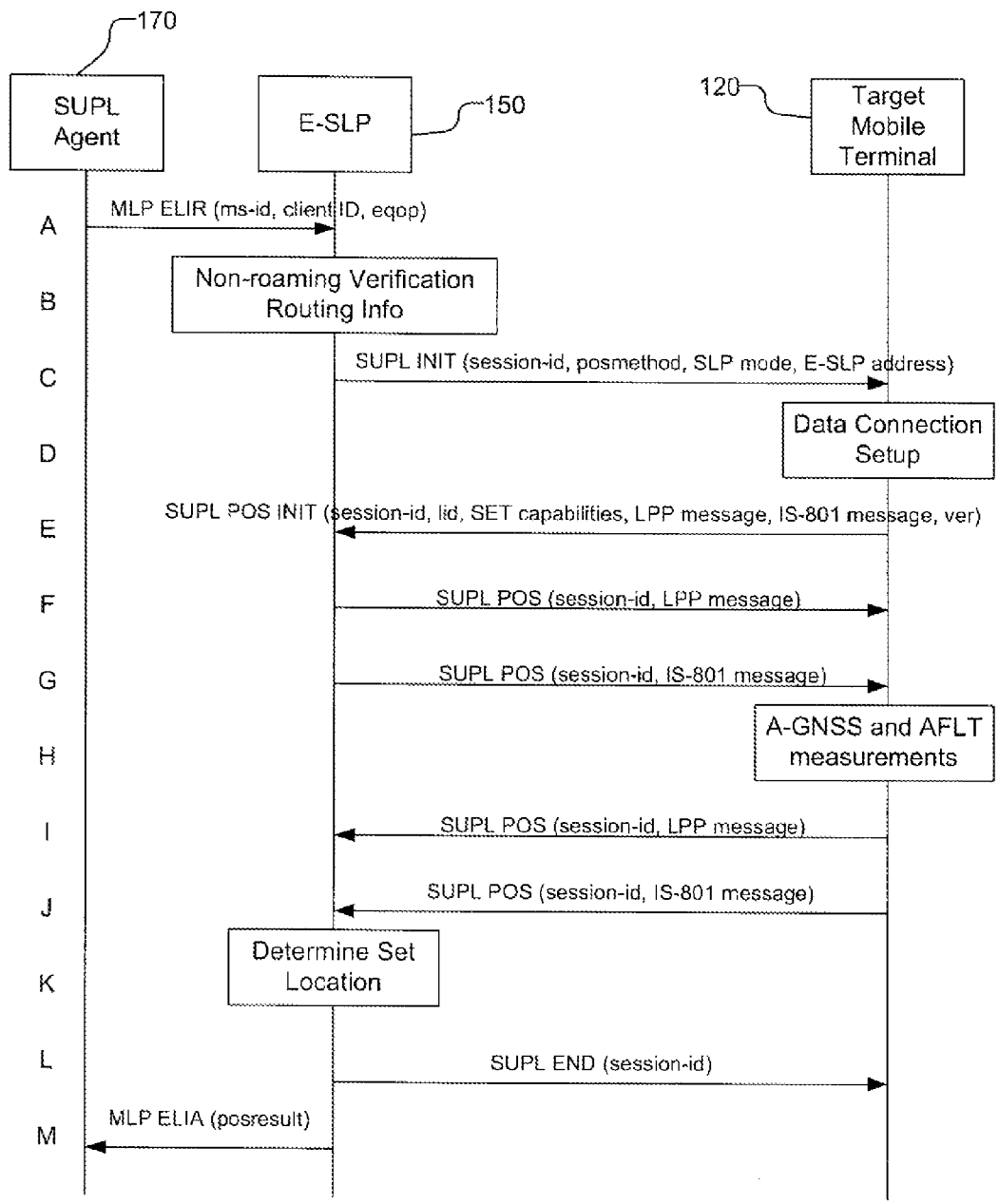
FIG. 2 shows an embodiment of a message flow where two positioning protocols are used during the same location session.

For clarity, FIG. 2 shows an embodiment of a message flow 190 where two positioning protocols are used within the same location session supported by SUPL (e.g., SUPL version 2.0). The message flow 190 is for network initiated emergency services for target mobile terminal 120 when non-roaming and in proxy mode, e.g., is initiated on behalf of some external client that is or is associated with a Public Safety Answering Points (PSAP) after the mobile terminal 120 has initiated an emergency call to this PSAP. The sequence of steps in FIG. 2 may apply when the mobile terminal 120 is not roaming, which means Core Network 1 130 in FIG. 1 is the home network for the mobile terminal 120 and SLP A 150 is behaving as an Emergency SLP (E-SLP) to support location on behalf of a PSAP client. FIG. 2 may also apply in roaming situations where Core Network 1 130 in FIG. 1 is the serving network but not the home network for mobile terminal 120. FIG. 2 is described assuming RAN1 140, which is associated with Core Network 1 130, is an LTE network and RAN2 142, which is associated with Core Network 2 132, is a 1x and/or EvDO network. Of course, appropriate modifications to the message flow of FIG. 1 as will be understood by those skilled in the art in light of the present disclosure, may be used for other configurations, such as when the positioning is mobile terminal 120 initiated or is in a non-emergency context, or when mobile terminal 120 is roaming, or when other types of access networks are used, or when other positioning protocols are used or when other versions of SUPL are used (e.g. a future SUPL version 3.0) or when a control plane location solution is used instead of SUPL.

Step A—SUPL Agent 170 (e.g. PSAP) issues a Mobile Location Protocol Emergency Location Immediate Request (MLP ELIR) message to the E-SLP 150, with which SUPL Agent 170 is associated. The MLP ELIR message may include the mobile station identifier (ms-id), e.g., the mobile terminal 120 IP address or the mobile terminal telephone number or SIP address, as well as a client identifier for the SUPL agent 170 (client-id), and quality of position parameters (eqop). The eqop specifies the requirements (e.g., accuracy and response time) on the calculated location being requested. The E-SLP 150 authenticates the SUPL Agent 170 and checks if the SUPL Agent 170 is authorized for the service it requests, based on the client-id received.

Step B—The E-SLP 150 verifies that the target mobile terminal 120 is currently not SUPL roaming (e.g. in this case verifies that the target mobile terminal 120 is accessing Core Network 1 130) and may also verify that mobile terminal 120 supports SUPL. The E-SLP 150 obtains routing information for mobile terminal 120 to be used to send messages to the mobile terminal 120.

Step C—The E-SLP 150 initiates the location session with the mobile terminal 120 using the SUPL INIT message. The SUPL INIT message contains at least a session ID (session-id), a proposed positioning method (posmethod), a proxy/non-proxy mode indicator (SLP mode), and the E-SLP 150 address, particularly if the E-SLP is not the H-SLP for the mobile terminal 120. The SUPL INIT may also include the desired QoP. The E-SLP 150 also includes a notification element in the SUPL INIT message indicating location for emergency services and, according to local regulatory requirements, whether notification or verification to the target mobile terminal 120 is or is not required. The SUPL INIT message may also indicate the positioning protocols supported by the E-SLP 150—e.g. may indicate-that E-SLP 150 supports both LPP and IS-801. Alternatively, the supported positioning protocols may not be included and mobile terminal 120 may simply assume that E-SLP 150 may support one or more positioning protocols—e.g. supports LPP and I-801. Before the SUPL INIT message is sent the E-SLP 150 also computes and stores a hash of the message.

Step D—The mobile terminal 120 takes needed action preparing for establishment or resumption of a secure connection, e.g., by either attaching itself to a packet data network (such as Core Network 1 130) if the mobile terminal 120 is not already attached for packet data access or establishing a circuit switched data connection.

Step E—The mobile terminal 120 evaluates notification rules and follows the appropriate actions. The mobile terminal also checks the proxy/non-proxy mode indicator to determine if the E-SLP 150 uses proxy or non-proxy mode. In message flow 190, proxy mode is used, and the mobile terminal 120 establishes a secure IP connection to the E-SLP 150 using either the provisioned H-SLP or defaulted E-SLP address, if no E-SLP address was received in step C, or the E-SLP address received in step C. The mobile terminal 120 then sends a SUPL POS INIT message to start a positioning session with the E-SLP 150. The SUPL POS INIT message contains at least the session-id, location ID (lid), the capabilities of the mobile terminal 120, and a hash of the received SUPL INIT message (ver). The mobile terminal capabilities include the supported positioning methods and associated positioning protocols. In this example, the mobile terminal indicates its ability to support the IS-801 and LPP positioning protocols and the positioning methods AFLT, mobile terminal assisted A-GPS and one or more mobile terminal assisted GANSS position methods. The mobile terminal also provides the serving LTE cell ID in the Location ID (lid) and the identity of one or more cdma2000 1x or EvDO cells from which the mobile terminal is able to receive signals. The mobile terminal may also include an LPP message and an IS-801 message—e.g. providing the mobile terminal's capabilities to support LPP and IS-801 (including the position methods, the types of assistance data and types of location measurements supported for each protocol).

Step F—The E-SLP 150 checks that the hash of SUPL INIT from the received SUPL POS INIT matches the one it has computed for this particular session. Based on the SUPL POS INIT message including posmethod(s) and positioning protocols supported by the mobile terminal 120 the E-SLP 150 then determines the positioning methods and position protocols to be used. In this example, as the mobile terminal 120 indicated support of LPP and mobile terminal assisted A-GPS and mobile terminal assisted GANSS, the E-SLP 150 sends a SUPL POS message to the mobile terminal 120 containing one or more LPP messages. The LPP messages may provide assistance data for mobile terminal assisted A-GNSS. The assistance data may be determined based on assistance data that the mobile terminal 120 indicates it supports in step E from any included LPP message in step E. The LPP messages may also request the mobile terminal 120 to perform and return A-GNSS measurements for supported GNSSs.

Step G—As the mobile terminal 120 indicated support of IS-801 and AFLT in step E, the E-SLP 150 may send another SUPL POS message to the mobile terminal 120 immediately after step F (or at the same time as or immediately before step F) containing one or more IS-801 messages. The IS-801 messages may provide assistance data for mobile terminal assisted AFLT. The assistance data may be determined based on assistance data that the mobile terminal requests in step E from any included IS-801 message in step E. The IS-801 messages may also request the mobile terminal 120 to perform and return AFLT measurements for 1x and/or EvDO base stations, e.g., RAN2 142 in FIG. 1. Instead of sending 2 separate SUPL POS messages in steps F and G, the E-SLP 150 may instead send a single SUPL POS message containing both the LPP message(s) from step F and the IS-801 message(s) from step G.

Step H—The mobile terminal 120 obtains A-GNSS measurements (e.g., GNSS pseudo range measurements) as requested by the LPP message(s) received in step F. The measurements may make use of assistance data (e.g. GNSS timing information related to an LTE base station such as the serving LTE base station in RAN1 140 in FIG. 1) as received in the LPP message(s) in step F. The mobile terminal 120 also obtains AFLT measurements (e.g., pilot phase measurements) for nearby 1x and/or EvDO base stations (e.g., RAN2 142 in FIG. 1) as requested by the IS-801 message(s) received in step G and using any assistance data received in the IS-801 message(s) in step G. Although the LPP and IS-801 messages received in steps F and G are separate and request different measurements and provide different assistance data, the mobile terminal 120 can be aware that these messages are being used to obtain a single location estimate either from their inclusion in the same SUPL session or, if steps F and G are combined, from their inclusion in the same SUPL POS message. Accordingly, the mobile terminal 120 may align all the measurements to the same time—e.g. by making the measurements at the same time or by making corrections to some or all measurements to determine measurements that would have been obtained at the same time. Aligning all measurements to the same time allows the E-SLP 150 to ignore movement of the mobile terminal 120 during the positioning period and more accurately combine all of the measurements to obtain a single location estimate. The mobile terminal 120 may also include a time stamp for the A-GNSS measurements that were requested using LPP and a separate time stamp for the AFLT measurements that were requested using IS-801 indicating the possibly different times at which these measurements were obtained. The E-SLP 150 can use the time stamps to verify whether the measurements were made at or adjusted to the same time instant. If the two times are not the same, the E-SLP 150 may allow for the different known times in its determination of the location of mobile terminal 120. For example, the mobile terminal may estimate the velocity of mobile terminal 120 using one or both sets of measurements and, if the estimated velocity is zero or close to zero, may treat both sets of measurements as referring to the same location. If the estimated velocity is not zero or close to zero, the E-SLP 150 may obtain two separate locations for mobile terminal 120, one based on the set of A-GNSS measurements and the other based on the set of AFLT measurements, and combine the two locations (e.g., by obtaining an average or weighted average). If this alignment of the measurements to a common time or allowance for different known times in the location determination is not performed, E-SLP 150 may not be able to accurately obtain the location of mobile terminal 120 if mobile terminal 120 is moving.

Step I—The mobile terminal 120 returns a SUPL POS message to the E-SLP 150 carrying an LPP message containing the A-GNSS measurements made in step H.

Step J—The mobile terminal 120 also returns a SUPL POS message to the E-SLP 150 carrying an IS-801 message containing the AFLT measurements made in step H. As an alternative to sending two separate SUPL POS messages, the mobile terminal 120 may return a single SUPL POS message containing both the LPP message of step I and the IS-801 message of step J. Steps F to J may be repeated—e.g. to request further. LPP or IS-801 related location measurements from mobile terminal 120 and/or to provide further assistance data if requested by mobile terminal 120 (in steps and J) to obtain previously requested location measurements.

Step K—The E-SLP 150 determines the location of the mobile terminal 120 from the A-GNSS and AFLT measurements received in steps I and J. If desired, as an alternative to sending two separate SUPL POS messages in steps I and J containing location measurements related to LPP and IS-801 and determining the location with the E-SLP in step K, the mobile terminal 120 may determine the location of the mobile terminal 120 from the A-GNSS and AFLT measurements and from any assistance data received in steps F and G and may send the location of the mobile terminal 120 to the E-SLP 150 in an LPP message in step I or in an IS-801 message in step J.

Step L—Once the position calculation is complete the E-SLP 150 sends the SUPL END message to the mobile terminal 120 informing the mobile terminal 120 that no further positioning procedure will be started and that the location session is finished. The mobile terminal 120 releases the IP connection to the E-SLP 150 and release all resources related to the session.

Step M—The E-SLP 150 sends the position estimate back to the SUPL Agent 170 by means of the Mobile Location Protocol Emergency Location Immediate Answer (MLP ELIA) message and the E-SLP 150 releases all resources related to this session.

Figure 3:
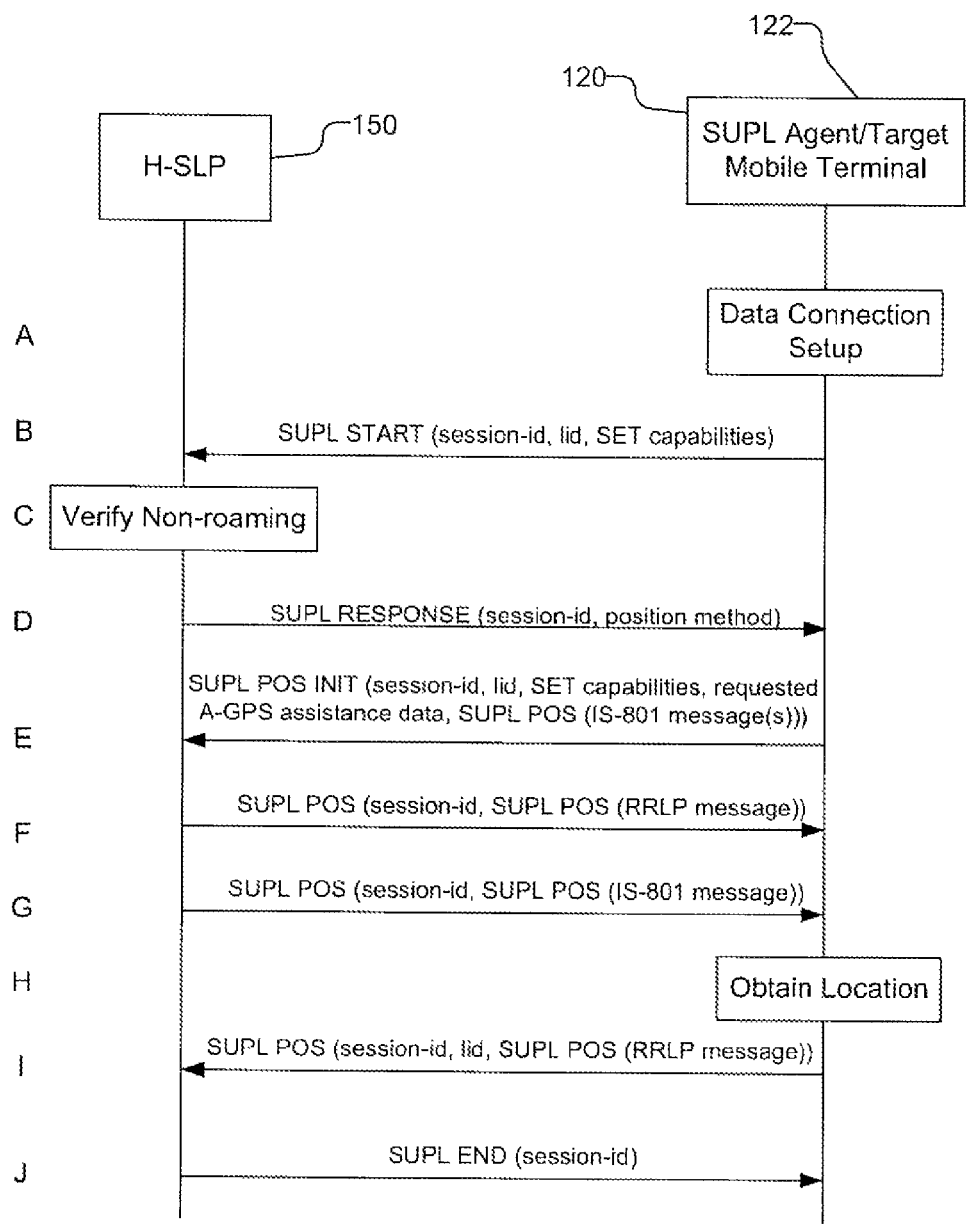
FIG. 3 shows another embodiment of a message flow where two positioning protocols are used within the same location session.

FIG. 3 shows another embodiment of a message flow where two positioning protocols are used within the same location session supported by SUPL (e.g., SUPL version 2.0). The message flow is for SET initiated location for target mobile terminal 120 when non-roaming and in proxy mode on behalf of SUPL Agent 122 resident in mobile terminal 120. FIG. 3 is described assuming RAN1 140, which is associated with Core Network 1 130, is a WCDMA network and RAN2 142, which is associated with Core Network 2 132, is a 1x and/or EvDO network. The message flow assumes SLP A 150 is the Home SLP (H-SLP) for mobile terminal 120.

Step A—SUPL Agent 122 receives a request for the position of mobile terminal 120 from some application running on mobile terminal 120. SUPL Agent 122 may communicate this request to another process on mobile terminal 120 that supports SUPL or may itself support SUPL. Mobile terminal 120 uses the default address provisioned by the Home Network to establish a secure connection to the H-SLP.

Step B—Mobile terminal 120 sends a SUPL START message to start a positioning session with the H-SLP. The SUPL START message contains a session-id, the SET capabilities of mobile terminal 120 and a Location ID (lid). The SET capabilities include the positioning methods and positioning protocols supported by mobile terminal 120. In this example, mobile terminal 120 indicates support for the terminal based A-GPS and AFLT positioning methods and for the RRLP and IS-801 positioning protocols.

Step C—H-SLP 150 verifies that mobile terminal 120 is currently accessing Core Network 1 130 and is thus not SUPL roaming.

Step D—H-SLP 150 returns a SUPL RESPONSE message to mobile terminal 120. The SUPL RESPONSE contains the session-id and the preferred positioning method which in this example is terminal based A-GPS. The SUPL. START may also contain a coarse approximation of the position of mobile terminal 120 based on information received in the SUPL START message.

Step E—Mobile terminal 120 sends a SUPL POS INIT message to the H-SLP 150. The SUPL POS INIT message contains at least the session-id, location ID (lid) and the capabilities of mobile terminal 120. The mobile terminal capabilities indicate the same supported positioning methods and positioning protocols as indicated in step B. The mobile terminal also provides the serving WCDMA cell ID (in RAN1 140) in the Location ID (lid) and the identity of one or more cdma2000 1x or EvDO cells (in RAN2 142) from which the mobile terminal is able to receive signals. The mobile terminal may also include in the Location ID network measurements for one or more WCDMA cells in RAN1 140 (e.g. for the serving cells and neighbor cells). The mobile terminal also indicates the assistance data that is needed to support terminal based A-GPS in association with a WCDMA serving network and further includes an embedded SUPL POS message containing one or more IS-801 messages providing the mobile terminal's capabilities to support terminal based AFLT and requesting assistance data from H-SLP 150 associated with terminal based AFLT.

Step F—Based on the SUPL POS INIT message including the positioning methods and positioning protocols supported by the mobile terminal 120 and any included IS-801 message(s), the H-SLP 150 determines the positioning methods and position protocols to be used. In this example, as the mobile terminal 120 indicated support of RRLP and mobile terminal based A-GPS and requested assistance data for terminal based A-GPS, the H-SLP 150 sends a SUPL POS message to the mobile terminal 120 containing either an RRLP Assistance Data message or an RRLP Measure Position Request. In either case the RRLP message contains assistance data for terminal based A-GPS. The assistance data may be determined based on the A-GPS assistance data requested by the mobile terminal 120 in step E. In the case of an RRLP Measure Position Request, the message also requests the location of the mobile terminal using terminal based A-GPS.

Step G—As the mobile terminal 120 indicated support of IS-801 and terminal based AFLT in step E, the H-SLP 150 sends another SUPL POS message to the mobile terminal 120 immediately after step F (or at the same time as or immediately before step F) containing one or more IS-801 messages. The IS-801 message(s) include assistance data for mobile terminal based AFLT. The assistance data may be determined based on assistance data that the mobile terminal requested in step E in the included IS-801 message(s). The assistance data may include information (e.g. location coordinates and pilot signal characteristics) concerning base stations in RAN2 142 that are nearby to the WCDMA base station serving mobile terminal 120 or whose identities were reported by mobile terminal 120 in step E. Instead of sending two separate SUPL POS messages in steps F and G, the H-SLP 150 may send a single SUPL POS message containing both the RRLP message from step F and the IS-801 message(s) from step G.

Step H—The mobile terminal 120 obtains A-GPS measurements (e.g. GPS pseudo range measurements) with the help of any A-GPS assistance data included in the RRLP message received in step F. The mobile terminal 120 also obtains AFLT measurements (e.g. pilot phase measurements) for nearby 1x and/or EvDO base stations in RAN2 142 with the help of any assistance data included in the IS-801 message(s) received in step G. Although the RRLP and IS-801 messages received in steps F and G are separate, support different position methods and provide different assistance data, the mobile terminal 120 can be aware that these messages can be used to obtain a single location estimate either from their inclusion in the same SUP POS session or, if steps F and G are combined, from their inclusion in the same SUPL POS message. Accordingly, the mobile terminal 120 may align all the measurements the same time—e.g. by making the measurements at the same time or by making corrections to some or all measurements to determine measurements that would have been obtained at the same time. The mobile terminal 120 may then use the measurements and the assistance data received in the RRLP message in step F and IS-801 message(s) in step G to determine its own location.

Step I—The mobile terminal 120 returns a SUPL POS message to the H-SLP 150 carrying either an RRLP Assistance Data Acknowledgment message if an RRLP Assistance Data message was received in step F or an RRLP Measure Position Response message if an RRLP Measure Position Request message was received in step F. In the former case, the message may be returned before, during or after step H. In the latter case, the message is returned after step H and may include the location for mobile terminal 120 obtained in step H.

Step J—The H-SLP 150 may store any location received in step I for future use. The H-SLP 150 sends the SUPL END message to the mobile terminal 120 informing the mobile terminal 120 that the location session is finished. The mobile terminal 120 releases the IP connection to the H-SLP 150 and releases all resources related to the session. The mobile terminal 120 then provides the mobile terminal 120 location obtained in step H to SUPL Agent 122 (if SUPL Agent 122 is not itself supporting the SUPL session in steps B to J). SUPL Agent 122 then provides the location to the requesting application.

Figure 4:
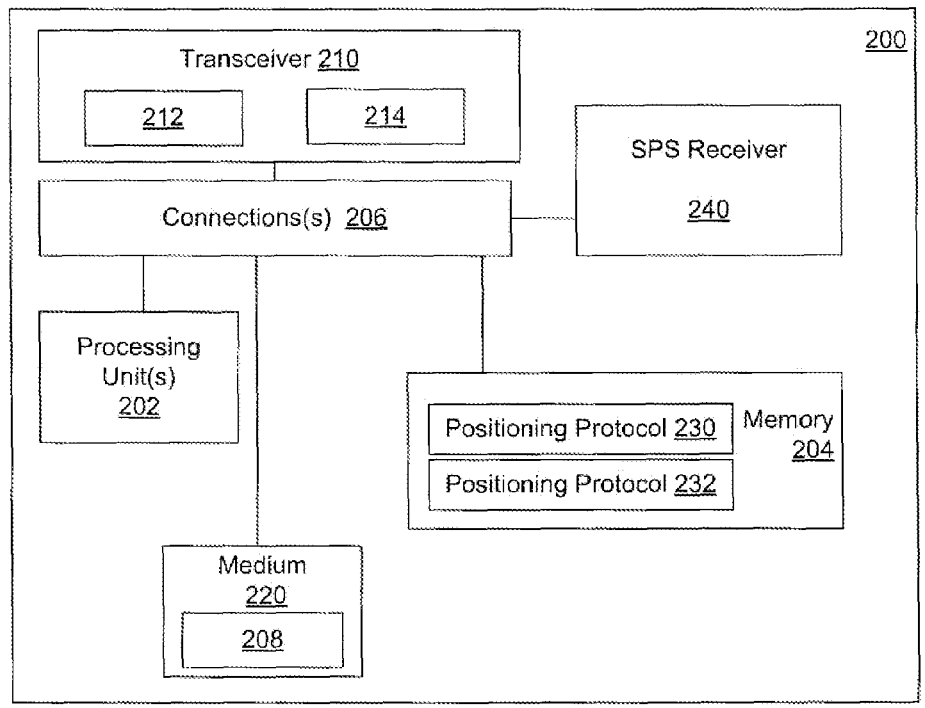
FIG. 4 is a schematic block diagram illustrating certain example features of a specific apparatus enabled to support a position determination process using two positioning protocols.

Reference is now made to FIG. 4, which is a schematic block diagram illustrating certain example features of a specific apparatus 200 enabled to support a position determination process using two positioning protocols as described herein. Apparatus 200 may, for example, be implemented in some form within mobile terminal 120, SLP A 150, and/or other like devices, as applicable, to perform or otherwise support at least a portion of the example techniques described herein.

Apparatus 200 may, for example, include one or more processing units 202, memory 204, a transceiver 210 (e.g., wireless network interface), and (as applicable) an SPS receiver 240, which may be operatively coupled with one or more connections 206 (e.g., buses, lines, fibers, links, etc.). In certain example implementations, all or part of apparatus 200 may take the form of a chipset, and/or the like.

If apparatus 200 is implemented in mobile terminal 120, for example, then SPS receiver 240 may be enabled to receive signals associated with one or more SPS resources. Transceiver 210 may, for example, include a transmitter 212 enabled to transmit one or more signals over one or more types of wireless communication networks and a receiver 214 to receive one or more signals transmitted over the one or more types of wireless communication networks. In certain implementations, transceiver 210 may also support wired transmission and/or reception, e.g., when implemented within the network location server and/or other like devices.

Processing unit 202 may be implemented using a combination of hardware, firmware, and software. Thus, for example, processing unit 202 may represent one or more circuits configurable to perform at least a portion of a data signal computing procedure or process related to the operation of apparatus 200.

The methodologies described herein may be implemented by various means depending upon the application. For example, these methodologies may be implemented in hardware, firmware, software, or any combination thereof. For a hardware implementation, the processing unit 202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic, units designed to perform the functions described herein, or a combination thereof.

A system includes means for obtaining a first position measurement of the mobile terminal using a first positioning protocol defined for a first wireless network, which may include SPS receiver 240, transceiver 210, processing unit 202, as well as associated computer readable instructions stored in medium 220 and/or memory 204 such as positioning protocol 230. The system may further include means for obtaining a second position measurement of the mobile terminal using a second positioning protocol that is different than the first positioning protocol and that is defined for a second wireless network that is different than the first wireless network, which may include SPS receiver 240, transceiver 210, processing unit 202, as well as associated computer readable instructions stored in medium 220 and/or memory 204 such as positioning protocol 232. The system may further include means for using the first position measurement and the second position measurement together to determine the position of the mobile terminal, which may include processing unit 202, as well as associated computer readable instructions stored in medium 220 and/or memory 204. The means for obtaining the first position measurement and the means for obtaining the second position measurement may be a means for receiving the first position measurement and means for receiving the second position measurement from the mobile terminal, which may be, e.g., transceiver 210. The system may include means for requesting the mobile terminal to perform and return the first position measurement using the first positioning protocol and to perform and return the second position measurement using the second positioning protocol, which may be transceiver 210, as well as processing unit 202, and associated computer readable instructions stored in medium 220 and/or memory 204. The system may include means for performing the first position measurement using the first positioning protocol, which may be processing unit 202, as well as associated computer readable instructions stored in medium 220 and/or memory 204 such as positioning protocol 230, and means for performing the second position measurement using the second positioning protocol, which may include processing unit 202, as well as associated computer readable-instructions stored in medium 220 and/or memory 204 such as positioning protocol 232. The system may further include means for receiving a request to perform and return the first position measurement using the first positioning protocol and to perform and return the second position measurement using the second positioning protocol, which may be, e.g., transceiver 210. The system may additionally include means for allowing for different known times at which the first position measurement and the second position Measurement were obtained, which may be which may include processing unit 202, as well as associated computer readable instructions stored in medium 220 and/or memory 204.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 204 that is connected to and executed by processor unit 202. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer readable medium, such as medium 220 and/or memory 204. Examples include computer-readable media encoded with a data structure and computer-readable media encoded with a computer program. For example, the non-transitory computer-readable medium including program code stored thereon may include program code to obtain a first position measurement using a first positioning protocol defined for a first wireless network, program code to obtain a second position measurement using a second positioning protocol that is different than the first positioning protocol and that is defined for a second wireless network that is different than the first wireless network in a same location session. The computer-readable medium may further include program code to obtain the first position measurement and to obtain the second position measurement in response to a request, and program code to transmit the first position measurement and the second position measurement. The computer-readable medium may further include program code to obtain the first position measurement and to obtain the second position measurement in response to a request, program code to determine a position based on the first position measurement and the second position measurement together, program code to transmit the position. The computer-readable medium may further include program code to send a request for the first position measurement and the second position measurement, and program code to determine a position based on the first position measurement and the second position measurement together. The computer-readable medium may further include program code to allow for different known times at which the first position measurement and the second position measurement were obtained. Non-transitory computer-readable media includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Memory 204 may represent any data storage mechanism. Memory 204 may include, for example, a primary memory and/or a secondary memory. Primary memory May include, for example, a random access memory, read only memory, etc. While illustrated in this example as being separate from processing unit 202, it should be understood that all or part of a primary memory may be provided within or otherwise co-located/coupled with processing unit 202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 220. As such in certain example implementations, the methods and/or apparatuses presented herein may take the form in whole or part of a computer-readable medium 220 that may include computer implementable instructions 208 stored thereon, which if executed by at least one processing unit 202 may be operatively enabled to perform all or portions of the example operations as described herein. Computer readable medium 220 may be a part of memory 204.

As illustrated in FIG. 4, memory 204 may also include instructions and/or information in the form of data signals associated with at least two different positioning protocols 230 and 232, e.g., LPP and IS-801. Additionally, the memory may include instructions and/or information in the form of data signals associated with different versions of the different positioning protocols.

Figure 5:
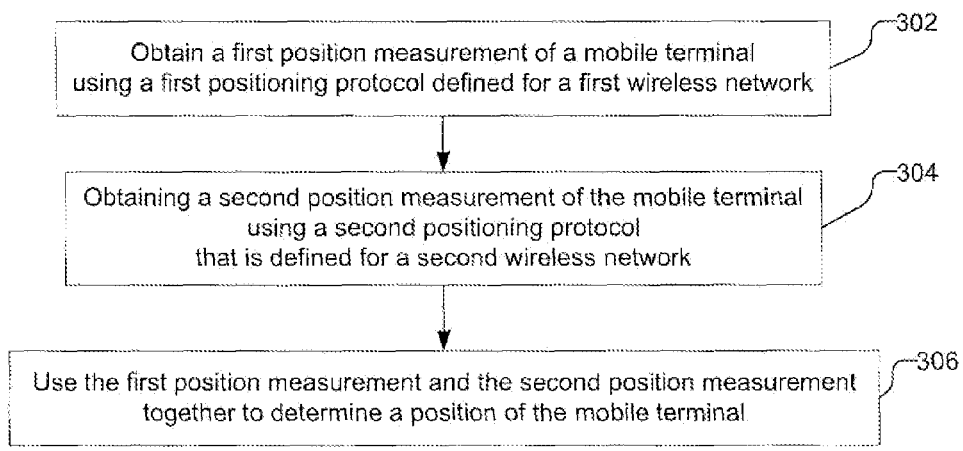
FIG. 5 illustrates a flow chart of a method of using multiple positioning protocols during the same location session.

FIG. 5 illustrates a flow chart of a method of using multiple positioning protocols during the same location session. The method includes obtaining a first position measurement of a mobile terminal using a first positioning protocol defined for a first wireless network (302). The method further includes obtaining a second position measurement of the mobile terminal using a second positioning protocol that is different than the first positioning protocol and that is defined for a second wireless network that is different than the first wireless network (304). Using the first position measurement and the second position measurement together, the position of the mobile terminal is determined (306). In one embodiment, obtaining the first position measurement and obtaining the second position measurement may include receiving the first position measurement and the second position measurement from the mobile terminal by a network location server that determines the position of the mobile terminal. For example, the network location server may receive the first position measurement and the second position measurement after requesting the mobile terminal to perform and return the first position measurement using the first positioning protocol and perform and return the second position measurement using the second positioning protocol. In another embodiment, obtaining the first position measurement and obtaining the second position measurement may include performing the first position measurement using the first positioning protocol and performing the second position measurement using the second positioning protocol. For example, if desired, the mobile terminal may determine the position of the mobile terminal. The mobile terminal may perform the first position measurement using the first positioning protocol and perform the second position measurement using the second positioning protocol in response to a request from a network location server. The first positioning protocol and the second positioning protocol may be, e.g., different ones of Radio Resource LCS (Location Services) Protocol (RRLP), Radio Resource Control (RRC), Long Term Evolution Positioning Protocol (LPP), and IS-801. Additionally, the first position measurement and the second position measurement may be aligned in time by obtaining the first position measurement and obtaining the second position measurement at a same time. The use of the first position measurement and the second position measurement together to determine the position of the mobile terminal may include allowing for different known times at which the first position measurement and the second position measurement were obtained.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
    initiating a location session between a mobile terminal and a network location server;
    obtaining a first position measurement for deriving a position estimate of the mobile terminal using a first positioning protocol defined for a first wireless network;
    obtaining a second position measurement for deriving the position estimate of the mobile terminal using a second positioning protocol that is different than the first positioning protocol and that is defined for a second wireless network that is different than the first wireless network, wherein the first position measurement and the second position measurement are both obtained during the location session;
    using the first position measurement and the second position measurement together to determine the position estimate of the mobile terminal; and
    ending the location session between the mobile terminal and the network location server after the position estimate of the mobile terminal is determined.

2. The method of claim 1, wherein obtaining the first position measurement and obtaining the second position measurement comprises receiving the first position measurement and the second position measurement from the mobile terminal by the network location server that determines the position estimate of the mobile terminal.

3. The method of claim 2, wherein the network location server receives the first position measurement and the second position measurement after requesting the mobile terminal to perform and return the first position measurement using the first positioning protocol and perform and return the second position measurement using the second positioning protocol.

4. The method of claim 1, wherein obtaining the first position measurement and obtaining the second position measurement comprises performing the first position measurement using the first positioning protocol and performing the second position measurement using the second positioning protocol.

5. The method of claim 4, further comprising the mobile terminal determining the position estimate of the mobile terminal.

6. The method of claim 4, wherein the mobile terminal performs the first position measurement using the first positioning protocol and performs the second position measurement using the second positioning protocol in response to a request from the network location server.

7. The method of claim 1, wherein the first positioning protocol and the second positioning protocol are different ones of Radio Resource LCS (Location Services) Protocol (RRLP), Radio Resource Control (RRC), Long Term Evolution Positioning Protocol (LPP), and IS-801.

8. The method of claim 1, wherein the first position measurement and the second position measurement are aligned in time by obtaining the first position measurement and obtaining the second position measurement at a same time.

9. The method of claim 1, wherein using the first position measurement and the second position measurement together to determine the position estimate of the mobile terminal comprises allowing for different known times at which the first position measurement and the second position measurement were obtained.

10. An apparatus comprising:
    a transceiver to communicate with a first wireless network and a second wireless network that is different than the first wireless network;
    a processor connected to the transceiver;
    memory connected to the processor; and
    software held in memory and run in the processor to cause the processor to initiate a location session between a mobile terminal and a network location server, to obtain a first position measurement for deriving a position estimate, the first position measurement is obtained using a first positioning protocol defined for the first wireless network; to obtain a second position measurement for deriving the position estimate, the second position estimate is obtained using a second positioning protocol that is different than the first positioning protocol and that is defined for a second wireless network that is different than the first wireless network, wherein the first position measurement and the second position measurement are both obtained during the location session; wherein the first position measurement and the second position measurement are used together to determine the position estimate of the apparatus, and to end the location session between the mobile terminal and the network location server after the position estimate of the mobile terminal is determined.

11. The apparatus of claim 10, wherein the apparatus is the mobile terminal further comprising a satellite positioning system connected to the processor, wherein the software causes the processor to perform the first position measurement using the first positioning protocol and to perform the second position measurement using the second positioning protocol in response to a request from the network location server.

12. The apparatus of claim 11, the software further causes the processor to send the first position measurement and the second position measurement to the network location server with the transceiver.

13. The apparatus of claim 11, wherein the software further causes the processor to determine a position of the mobile terminal based on the first position measurement and the second position measurement together, and the software further causes the processor to send the position estimate of the mobile terminal to the network location server with the transceiver.

14. The apparatus of claim 10, wherein the apparatus is the network location server, wherein the software causes the processor to send a request to the mobile terminal for the first position measurement and the second position measurement with the transceiver and in response obtain from the mobile terminal the first position measurement and the second position measurement.

15. The apparatus of claim 14, wherein the software further causes the processor to determine a position of the mobile terminal based on the first position measurement and the second position measurement together.

16. The apparatus of claim 10, wherein the first positioning protocol and the second positioning protocol are different ones of Radio Resource LCS (Location Services) Protocol (RRLP), Radio Resource Control (RRC), Long Term Evolution Positioning Protocol (LPP), and IS-801.

17. The apparatus of claim 10, wherein the first position measurement and the second position measurement are obtained aligned in time.

18. The apparatus of claim 10, wherein the software further causes the processor to allow for different known times at which the first position measurement and the second position measurement were obtained.

19. A system for determining a position of a mobile terminal comprising:
  means for initiating a location session between the mobile terminal and a network location server;
  means for obtaining a first position measurement for deriving a position estimate of the mobile terminal using a first positioning protocol defined for a first wireless network;
  means for obtaining a second position measurement for deriving the position estimate of the mobile terminal using a second positioning protocol that is different than the first positioning protocol and that is defined for a second wireless network that is different than the first wireless network, wherein the first position measurement and the second position measurement are both obtained during the location session;
  means for using the first position measurement and the second position measurement together to determine the position estimate of the mobile terminal; and
  means for ending the location session between the mobile terminal and the network location server after the position estimate of the mobile terminal is determined.

20. The system of claim 19, wherein the means for obtaining the first position measurement and the means for obtaining the second position measurement comprise means for receiving the first position measurement and means for receiving the second position measurement from the mobile terminal.

21. The system of claim 20, further comprising means for requesting the mobile terminal to perform and return the first position measurement using the first positioning protocol and to perform and return the second position measurement using the second positioning protocol.

22. The system of claim 19, wherein the means for obtaining the first position measurement and the means for obtaining the second position measurement comprises means for performing the first position measurement using the first positioning protocol and means for performing the second position measurement using the second positioning protocol.

23. The system of claim 22, further comprising means for receiving a request to perform and return the first position measurement using the first positioning protocol and to perform and return the second position measurement using the second positioning protocol.

24. The system of claim 19, wherein the first positioning protocol and the second positioning protocol are different ones of Radio Resource LCS (Location Services) Protocol (RRLP), Radio Resource Control (RRC), Long Term Evolution Positioning Protocol (LPP), and IS-801.

25. The system of claim 19, wherein the first position measurement and the second position measurement are aligned in time by obtaining the first position measurement and obtaining the second position measurement at a same time.

26. The system of claim 19, wherein the means for using the first position measurement and the second position measurement together to determine the position estimate of the mobile terminal comprises means for allowing for different known times at which the first position measurement and the second position measurement were obtained.

27. A non-transitory computer-readable medium including program code stored thereon, comprising:
  program code to initiate a location session between a mobile terminal and a network location server;
  program code to obtain a first position measurement for deriving a position estimate, the first position measurement is obtained using a first positioning protocol defined for a first wireless network; and
  program code to obtain a second position measurement for deriving the position estimate, the second position measurement is obtained using a second positioning protocol that is different than the first positioning protocol and that is defined for a second wireless network that is different than the first wireless network in a same location session, wherein the first position measurement and the second position measurement are both obtained during the location session;
  wherein the first position measurement and the second position measurement are used together to determine the position estimate; and
  program code to end the location session between the mobile terminal and the network location server after the position estimate of the mobile terminal is determined.

28. The computer-readable medium of claim 27, further comprising:
  program code to obtain the first position measurement and to obtain the second position measurement in response to a request; and
  program code to transmit the first position measurement and the second position measurement.

29. The computer-readable medium of claim 27, further comprising:
  program code to obtain the first position measurement and to obtain the second position measurement in response to a request;

program code to determine a position based on the first position measurement and the second position measurement together; and program code to transmit the position estimate.

30. The computer-readable medium of claim 27, further comprising:

program code to send a request for the first position measurement and the second position measurement; and program code to determine a position based on the first position measurement and the second position measurement together.

31. The computer-readable medium of claim 27, wherein the first positioning protocol and the second positioning protocol are different ones of Radio Resource LCS (Location Services) Protocol (RRLP), Radio Resource Control (RRC), Long Term Evolution Positioning Protocol (LPP), and IS-801.

32. The computer-readable medium of claim 27, wherein the first position measurement and the second position measurement are obtained aligned in time.

33. The computer-readable medium of claim 27, further comprising:

program code to allow for different known times at which the first position measurement and the second position measurement were obtained.

* * * * *